United States Patent

Burk et al.

Patent Number: 5,207,999
Date of Patent: May 4, 1993

[54] GENERATION OF FLUORINE VIA THERMAL PLASMA DECOMPOSITION OF METAL FLUORIDE

[75] Inventors: Robert C. Burk, Ottawa; Maher I. Boulos, Sherbrooke; Dennis G. Garratt, Saskatoon; Tadeusz W. Zawidzki, Gloucester; Andrzej Huczko, Sherbrooke, all of Canada

[73] Assignee: Cameco Corporation, Saskatoon, Canada

[21] Appl. No.: 744,413

[22] Filed: Aug. 13, 1991

[51] Int. Cl.⁵ .......... C01B 7/20; C01B 9/08; C01G 43/06; C01G 43/01
[52] U.S. Cl. .......... 423/258; 423/259; 423/489; 423/490; 423/500; 423/DIG. 10
[58] Field of Search .......... 423/258, 259, 500, 490, 423/489, 15, DIG. 10; 204/164, 157.48, 157.5; 252/626

[56] References Cited

U.S. PATENT DOCUMENTS

| | | | |
|---|---|---|---|
| H59 | 5/1986 | Kreuzmann et al. | 423/490 |
| 3,891,690 | 6/1975 | Layne et al. | 423/465 |
| 4,564,507 | 1/1986 | Elliott | 423/5 |
| 4,689,178 | 8/1987 | Gay et al. | 423/166 |
| 4,874,599 | 10/1989 | Gay et al. | 423/490 |
| 5,015,863 | 5/1991 | Takeshima et al. | 250/515.1 |

FOREIGN PATENT DOCUMENTS

| | | | |
|---|---|---|---|
| 0272110 | 8/1963 | Australia | 204/164 |
| 1472501 | 3/1966 | France. | |
| 2229172A | 9/1990 | United Kingdom. | |

OTHER PUBLICATIONS

Journal of Nuclear Materials, 149 (1987) 103-104. "Production of Uranium Metal Using a Thermal Plasma".
Journal of Fluorine Chemistry, 8 (1976) 165-176. Moss "The Fluorination of Uranium and Vanadium Oxides with some Metal Fluorides".

Primary Examiner—Michael Lewis
Assistant Examiner—Valerie Lund
Attorney, Agent, or Firm—Nixon & Vanderhye

[57] ABSTRACT

A compound $MF_n$, where M is a metal and n is the valency of the metal and has a value between 1 and 6, is subjected to a thermal plasma at a temperature in excess of 3000 K to dissociate it into the metal and fluorine. Also present in the reactor is an added reactant that will react with the metal or the fluorine to prevent their recombination so that there is formed fluorine gas or a fluoride other than the fluoride of the metal M.

9 Claims, 4 Drawing Sheets

GENERATION OF FLUORINE VIA THERMAL PLASMA DECOMPOSITION OF METAL FLUORIDE

The present invention relates to a process for converting a fluoride of a metal to free fluorine gas or to a fluoride of an element other than the metal.

BACKGROUND OF THE INVENTION

Fluorine occurs in nature in various minerals and industrially fluorine is obtained from the mineral fluorspar, $CaF_2$. Finely ground fluorspar is reacted with concentrated sulfuric acid to yield hydrogen fluoride. This is dried and then reacted with potassium fluoride to form potassium hydrogen fluoride, $KF.nHF$, where n has a value from 1 to 3. Anhydrous potassium hydrogen fluoride is subjected to electrolysis and fluorine gas is obtained at the anode. At present fluorine is an expensive chemical, particularly when purchased in small quantities. The market for fluorine is large and growing. Fluorine is used, for instance, in the nuclear industry for the manufacture of $UF_6$, and $SF_6$ is now being used as a dielectric in transformers, in place of chlorinated biphenyls.

Magnesium fluoride does not appear in nature, but large quantities of fluorine are present in uranium-contaminated magnesium fluoride that is obtained from reduction of $UF_4$ to uranium metal by the thermite reaction. At present this uranium-contaminated magnesium fluoride is stockpiled, at considerable expense.

Another source of fluorine is $UF_6$, particularly tails from a uranium-enrichment process in the nuclear industry. Naturally occurring uranium is composed mostly of $^{238}U$, with about 0.71 % of the radioactive isotope $^{235}U$. For use in the nuclear industry the content of radioactive $^{235}U$ must be increased to give enriched uranium. Enrichment is achieved for instance by gaseous diffusion of $UF_6$. In addition to the desired enriched product, the enrichment process yields a large quantity of $UF_6$ that is depleted in content of $^{235}U$. An economical process for converting the depleted $UF_6$ into uranium metal and fluorine would be of considerable value. The fluorine could be recycled to the formation of undepleted $UF_6$ for subjection to the enrichment process. The depleted uranium metal has uses, for instance, in shielding reactors and in military armour and projectiles.

A letter to the editors of the Journal of Nuclear Materials 149 (1987) 103-107 discloses that a small amount of uranium metal has been obtained by subjecting $UO_3$ or $UF_6$ to the effect of an argon plasma.

SUMMARY OF THE INVENTION

The present invention provides a process for producing free fluorine gas or a fluoride which comprises subjecting a compound $MF_n$, where M is a metal and n is the valency of the metal and has a value of from 1 to 6 inclusive, to the effect of a thermal plasma at a temperature of at least 3000 K to cause $MF_n$ to separate into its constituents, the reaction being carried out in the presence of an added reactant that reacts with the metal M and/or the fluorine to prevent their recombination, so that there is formed free fluorine and/or a fluoride that is other than $MF_n$.

It is desirable that recombination of the metal M with fluorine shall be prevented to as great an extent as possible, but it is not essential that all recombination shall be prevented. Processes in accordance with the invention can display attractive economics even when some recombination occurs.

DESCRIPTION OF THE PREFERRED EMBODIMENTS

In one preferred embodiment of the invention the metal M is calcium, and one suitable source of calcium is the mineral fluorspar. The invention provides a process that can yield free fluorine gas or a desired fluoride from fluorspar without necessity for conversion of the fluorspar to hydrogen fluoride, subsequent conversion to potassium hydrogen fluoride and electrolysis. It is estimated that fluorine can be obtained from fluorspar by the process of the invention at a cost that is significantly less than that of the conventional route.

In another preferred embodiment the metal M is magnesium and use is made of the uranium-contaminated $MgF_2$ that is mentioned above. This has the advantages as a source of fluorine that are mentioned with respect to calcium in the preceding paragraph. An important additional advantage is that an expensively stockpiled, contaminated material is disposed of. In the course of reaction in the plasma the uranium contaminant present in the magnesium fluoride feed will react with fluorine, to form $UF_6$. This compound is required by the nuclear industry. Hence the stockpiled material can be disposed of by conversion to valuable products.

Stored $UF_6$ that is depleted in $^{235}U$ and is a by-product of a uranium-enrichment process is another source of fluorine. Rare earths are sometimes available as fluorides, so the metal M can be a rare earth. Mention is made particularly of neodymium and gadolinium, which can be converted from their fluorides to the free metal by the process of the invention. The free metals are useful in high powered magnets.

According to the invention there is added to the reaction in the plasma flame a reactant that will combine with the metal M and/or with the fluorine present in the flame and thereby prevent recombination of metal M and fluorine to reform $MF_n$. The added reactant can be any reactant that will remove fluorine from the reaction mixture before the fluorine can recombine with the metal M, or any reactant that will remove the metal M before the metal M can recombine with the fluorine. Factors affecting removal of the fluorine, or removal of the metal M, include the kinetics of the reaction between the fluorine, or the metal M, and the added reactant, the volatility of the species formed in the reaction, the rate of quenching, etc. Reactants that will remove fluorine include, but are not limited to, hydrogen, sulfur, silicon, silica (which can be in the form of sand), alumina and uranium. Reactants that will remove the metal M include oxygen, nitrogen, sulfur and chlorine.

When oxygen is used as the added reactant it can be present as molecular oxygen, $O_2$, or it can be present as an oxide of a metal. If oxygen is present as molecular oxygen it is conveniently supplied as air. If it is present as an oxide of a metal there will be formed a fluoride of that metal. If the metal whose oxide is added is capable of forming several fluorides then some or all of the possible fluorides may be formed. For instance, if oxygen is added in the form of an oxide of uranium there will be formed $UF_4$ and $UF_6$. Also oxyfluorides have been found in the products when oxides of uranium have been used. These oxyfluorides can be recycled to the reaction, if desired.

In some cases the added reactant is one chemical compound that provides two reactants, one reactant to remove fluorine and one reactant to remove the metal M. For instance, an oxide of uranium will provide uranium for the removal of fluorine and oxygen for the removal of the metal M as an oxide.

If chlorine is used it can be supplied as molecular chlorine, $Cl_2$, or as a metal chloride. If it is present as a chloride there will be formed a chloride of that metal. In fact it is contemplated that chlorine and chlorides will not be used for economic, not technical, reasons.

The reaction is carried out in a plasma at a temperature in excess of 3000 K, preferably in excess of 4000 K and most preferably in excess of 5000 K. Good results have been obtained at temperatures of about 5500 K to 5800 K, and higher temperatures favour higher efficiency of conversion. Temperatures can be considerably higher, even as high as 20,000 K or higher, but using these higher temperatures is expensive of power and may not be economically justified.

There are various types of thermal DC and AC plasma heaters, e.g. d.c. plasma torches of the hot or cold cathode type, radio frequency, inductively coupled plasma torches, and d.c. or a.c. transferred arc plasma furnaces. These different types all have their particular advantages and disadvantages and all can be used in the process of the invention.

From a technical point of view, the plasma itself can be, for example, an air, argon, nitrogen, argon/hydrogen or argon/nitrogen plasma. If an air plasma is used the molecular oxygen present in the air will also serve as the added reactant to prevent recombination, forming an oxide of the metal M. If a hydrogen-containing plasma is used, the hydrogen will also serve as the added reactant to prevent recombination of the metal M with fluorine. There will result formation of hydrogen fluoride.

Hydrogen is particularly effective as the added reactant for preventing recombination of the metal M and fluorine, but use of hydrogen results in formation of hydrogen fluoride. If it is desired to produce free fluorine or a fluoride other than hydrogen fluoride there should be used a plasma and a reaction system that are both free from hydrogen and hydrogen-containing compounds. For instance, if the starting material is uranium-contaminated magnesium fluoride and it is desired to form $UF_6$ using the uranium as the reactant to prevent recombination of magnesium and fluorine, the plasma and reaction system used should be free of hydrogen and hydrogen-containing compounds so that there is formed $UF_6$, not HF.

It is possible to supply the added reactant to the reaction in various way. In some cases a component of the plasma gas serves as the added reactant. In other cases an auxiliary gas is injected into the plasma. The products of the reaction will be affected by the plasma used and also by any auxiliary gases fed to the plasma. For instance if magnesium fluoride is dissociated in a plasma to which water vapour is fed as an auxiliary gas there will be obtained magnesium oxide and hydrogen fluoride. If a hydrogen-containing plasma or a hydrogen-containing auxiliary gas is used there will be obtained magnesium metal and hydrogen fluoride. These products are available cheaply via other synthetic routes, so economics will not favour these reactions except in special circumstances that create a compensating advantage. If the metal M is obtained as such, the metal may be in the form of a finely divided powder and this could be a compensating advantage depending upon the metal. The reactant $MF_n$ can be fed to the plasma as a powder. The powder particles should be fed into a zone of the plasma flame where effective vaporisation and dissociation will occur, i.e., a hot zone of the plasma flame. The particles can be fed directly into the plasma torch, i.e., along the axis of the plasma flame, or externally to the plasma torch. From the point of view of theoretical efficiency of the process the former is to be preferred, but it may cause corrosion, erosion of electrodes and other practical problems. The powder, which is suitably fed from a hopper, is preferably finely divided. For ease of flow from the hopper it should be monodispersed, i.e., all particles should be of substantially the same size.

In an alternative embodiment the $MF_n$ powder is suspended in a fluidized bed and fed from the fluidized bed with an inert carrier gas such as argon to the injection nozzle. In yet another embodiment the plasma flame can be directed into a fluidized bed of the powder $MF_n$.

With a powder injection system some of the particles may not have sufficient residence time within the plasma to acquire enough heat for vaporization and dissociation. Unreacted powder can be recycled. Unreacted $MF_n$ from one plasma can be fed to a second plasma for further reaction, and so on. Thus it is possible to have a number of plasma heaters in series, but this is not preferred. Factors such as powder particle size, feed rate, geometry and location of feed nozzle can be varied to optimise operation.

In other embodiments the reactant $MF_n$ is contained in a crucible, suitably of graphite, and the plasma flame impinges on the surface of the sample, or the $MF_n$ powder is blended with a binder to form a solid of shape suitable for feeding to the plasma.

The reactant $MF_n$ can be melted and fed as a fluid to the plasma in which the dissociation reaction occurs. This can be done in a preheating step, suitably in another plasma. Depending upon the metal M the molten $MF_n$ may be viscous and may possibly form a plug. Furthermore, contact between molten $MF_n$ and electrodes could lead to electrode erosion problems, so this embodiment is not normally preferred.

In one embodiment of the invention magnesium fluoride is dissociated in an air plasma using an oxide of uranium to prevent recombination of magnesium atoms and fluoride atoms. The oxide of uranium can be for example, $UO_2$, $UO_3$ or $U_3O_8$ and chemical reactions that can occur are illustrated with reference to $UO_3$ as follows $$3MgF_2 + UO_2 \rightarrow 3MgO + UF_6$$

For this purpose the oxide of uranium can be unpurified yellowcake. As one product there is obtained $UF_6$, an important intermediate in the preparation of enriched uranium dioxide for nuclear fuel. The magnesium oxide can be obtained in a finely divided, highly pure form that is of considerable value in the electronics industry.

In another embodiment fluorine gas from a plasma is fed, while still hot from the plasma, into a fluidized bed of oxide of uranium where reaction occurs to form $UF_6$.

In experiments carried out in examples described below, magnesium fluoride powder of about 14 $\mu m$ particle size was fed to an air plasma. After reaction solid material that had deposited on a collector plate downstream of the plasma flame was collected and its particle size distribution was determined. It was found that the distribution showed two peaks, one at about 0.2 $\mu$m means particle size and one at about 42 $\mu$m mean particle size. Particles of each size were examined by scanning electron microscope (SEM). The larger particles were also examined by X-ray diffraction (XRD). It was not possible to examine the smaller particles by XRD as the particles were amorphous, not crystalline.

On the basis of observations it is hypothesized that the larger particles were formed when magnesium fluoride particles fed into the plasma did not enter the hottest part of the plasma, or did not remain for a sufficient length of time in the hottest part of the plasma, and did not acquire enough heat to vapourize and dissociate. However, the particles did acquire enough heat to sinter, or to melt, and agglomerate. Hence some of the particles of 14 $\mu$m became aggregated to form 42 $\mu$m particles. Other of the 14 $\mu$m particles may have become molten and droplets may have broken up and then solidified to form particles less than 14 $\mu$m but greater than 0.2 $\mu$m. The observations of the 42 $\mu$m particles by the scanning electron microscope and by X-ray diffraction are consistent with this hypothesis, as the morphology is consistent with sintering and with melting and agglomeration. It is hypothesized that the smaller, amorphous particles were formed from magnesium fluoride that did acquire enough heat to vapourize, or to vapourize and dissociate, and the particles are formed by recombination of some of the dissociated magnesium fluoride, followed by condensation, and also by condensation of vapourized magnesium fluoride that did not dissociate. This hypothesis is consistent with the reduction in particle size from about 14 $\mu$m to about 0.2 $\mu$m and also consistent with the observations by SEM and the amorphous structure.

It will be appreciated that when calculating the theoretical efficiency of the reaction the calculation should not include that amount of the magnesium fluoride feed that did not acquire sufficient heat to vapourize and dissociate, and was consequently unable to participate in the reaction. In the particular experimental arrangement the amount of $MgF_2$ that did not acquire sufficient heat to react was about 70%, so this amount was deducted from the amount of $MgF_2$ fed before the efficiency of conversion was calculated.

By optimisation it should be possible to reduce that amount of the fed $MgF_2$ that does not acquire sufficient heat to react.

DESCRIPTION OF THE DRAWINGS

The invention will be further illustrated with reference to the accompanying drawings and the following examples. Of the drawings, FIG. 1 schematically illustrates the plasma reactor that was used in Examples 1 and 2;

FIG. 2 shows parts of the apparatus of FIG. 1 in greater detail. The same numbers are used in FIG. 2 as in FIG. 1. FIG. 2 also shows an injection nozzle 13 from which $MF_n$ powder can be fed, for example from a hopper (not shown). Also shown in FIG. 2 is the plasma flame 14. As can be seen, the point of the plasma flame into which the powder is fed can be varied by selection of the injection nozzle 2, 3 or 4. The plasma torch can also be displaced, so that the horizontal distance a and the radial distance b of the point of powder injection from the plasma torch can be varied.

Figure 1:
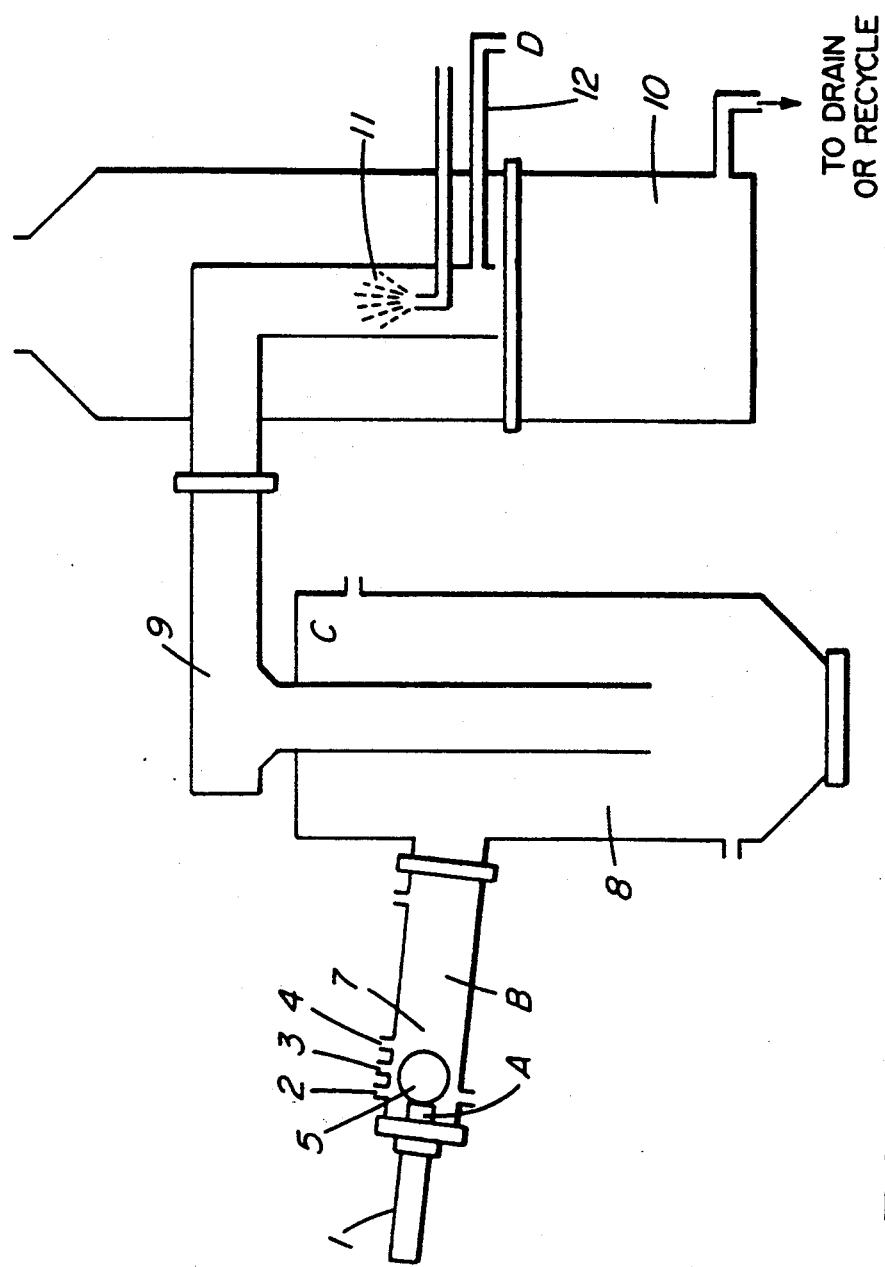
Referring to FIG. 1, there is shown a plasma torch 1, injections ports 2, 3 and 4 and a viewing port 5. Reaction commences in a plasma flame section 7, from which gases exit into a reaction and collection chamber 8. From this chamber gases pass via conduit 9 into a scrubber tank 10, being scrubbed with water from a water spray nozzle 11 as they pass through conduit 9 on their way to scrubber tank 10. A sampling outlet 12 is provided in the scrubber tank. From the scrubber tank gases are exhausted from the top and liquid is exhausted from the bottom for draining or recycling. Letters A, B, C and D indicate regions from which, in the examples described below, solid material including magnesium fluoride was collected after runs.
Figure 2:
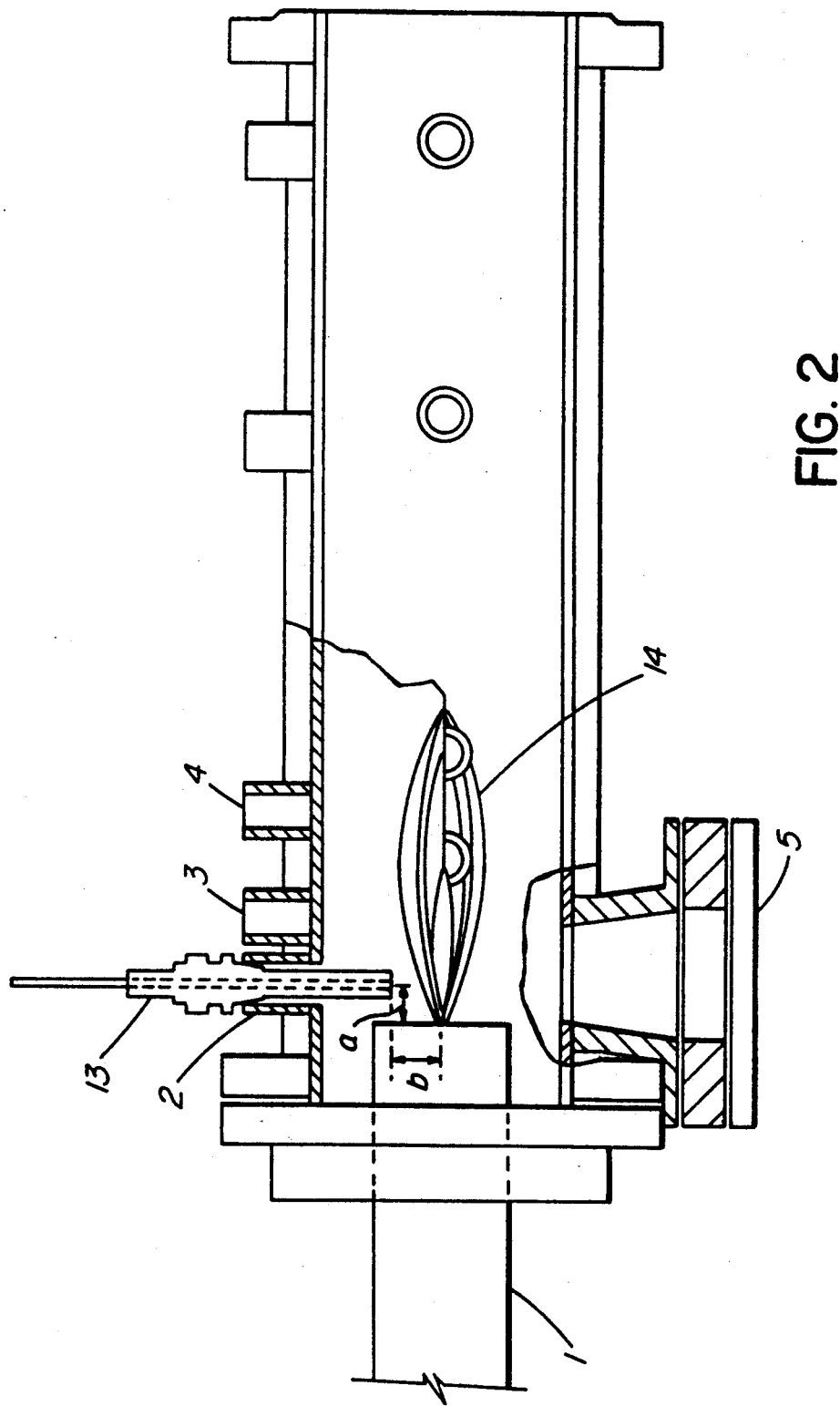
FIG. 2 shows the plasma torch section of the plasma reactor of FIG. 1 in greater detail.

Although not shown in FIGS. 1 and 2, it is possible to include cooled baffles in the apparatus, just downstream of the plasma flame to cause precipitation of metal M. The metal can be obtained as a finely divided powder by this means.

Figure 3:
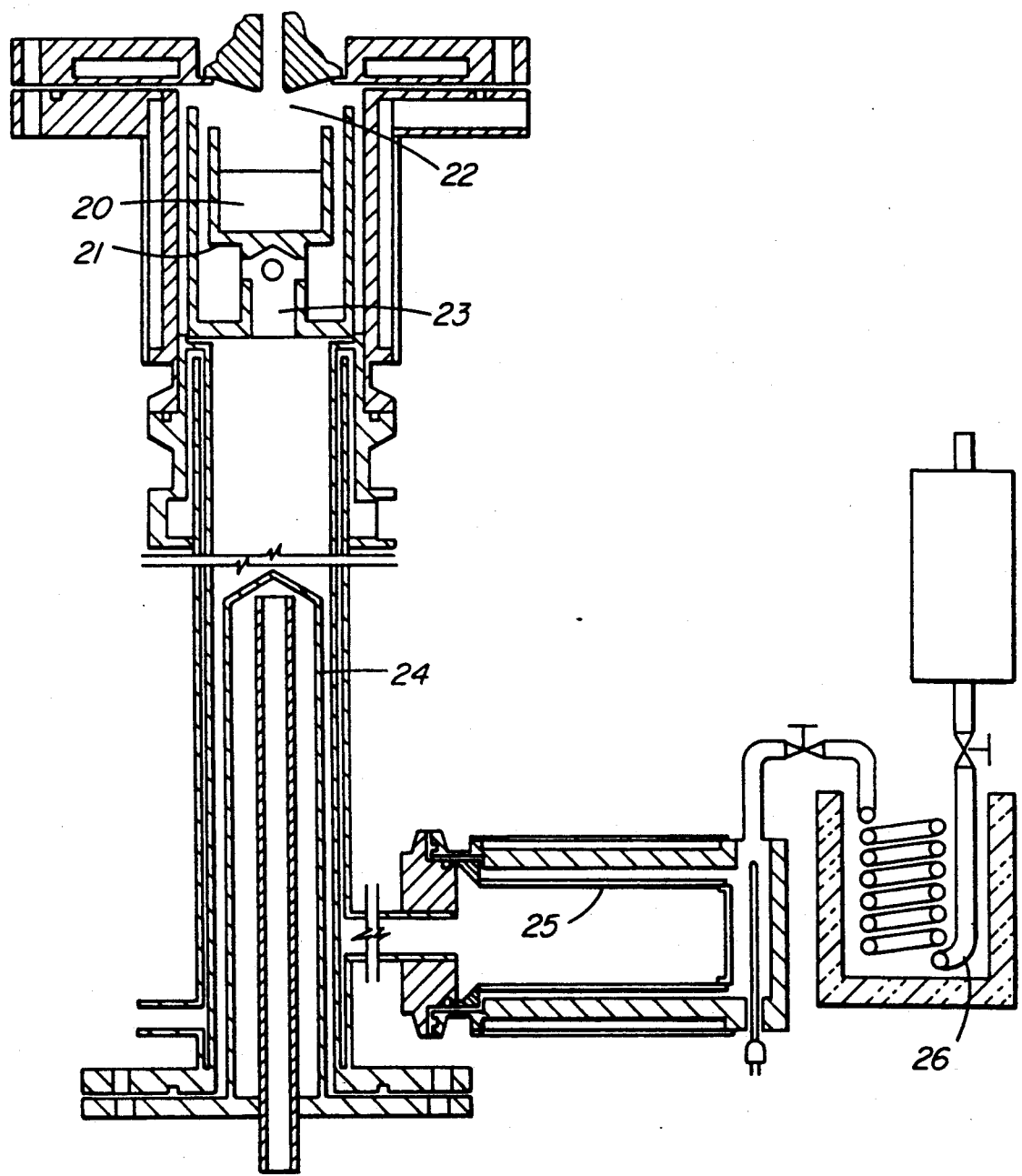
FIG. 3 is a schematic illustration of apparatus used in Example 3.

FIG. 3 shows a small scale, 10–20 kW experimental plasma reactor, for use in a batch process. In zone A of the apparatus, a small cylindrical pellet 20, 30 mm in diameter and 10 to 30 mm high, is located in a supported graphite crucible 21, where it can be heated by means of a plasma jet 22.

In use, as the temperature rises material of the pellet melts and vapourizes. Vapour passes through a hot trap (zone B), where any entrained solid or liquid is collected, and emerges through a central channel 23 of graphite support into a cooling zone C, which has a tubular water-cooled condenser. A cold finger 24 is also provided in zone C. From zone C vapour passes to a collection zone D that contains a porous metal filter 25, followed by a further cold trap 26 (dry ice and acetone).

Gas from the cooling zone C was sent, on-line, for gas analysis using a VG-Micromass PC-300 spectrometer, not shown.

Material from zones C and D was collected and subjected to various analyses. It was found that the materials from zones C and D were very similar in composition, although different from the starting material.

EXAMPLE 1

Magnesium fluoride, 98% pure and of about 14 $\mu$m particle size (100 mesh), was fed externally into the plasma torch of a 150 kW non-transferred arc plasma reactor as illustrated in FIGS. 1 and 2.

The plasma gas was dry air that was fed at a rate of 311 litres/minute (STP). The plasma torch was operated at an arc current of 300 Amps and gave a total arc power of about 140 kW. The duration of runs was from 10 to 20 minutes. Runs were carried out at average gas temperatures that varied between 4650 K and 5800 K. The magnesium fluoride was fed from a fluidized bed with argon as a carrier gas at 15 SCFM to improve and even the flow.

The powdered magnesium fluoride entered the reactor from a water-cooled nozzle of Inconel 600, which is resistant to corrosive fluorine. Nozzles with two different diameters and two different angles of injection were used. Runs 1, 2 and 3 were carried out with a 6.3 mm diameter nozzle and an angle of injection of 0°, so that the powder was fed at an angle of 90° to the plasma flame. Runs 4 to 11 were carried out with a 5 mm diameter nozzle. Runs 4 to 7, 10 and 11 used a nozzle with an angle of injection of 0°, so that the powder was fed at an angle of 90° to the plasma flame. Runs 8 and 9 used a nozzle with an angle of injection of 20°, so that the powder was fed at an angle of 70° to the plasma flame. In run 3 the powder was fed horizontally into the plasma flame. In all other runs it was fed vertically downwards into the flame. The time during which magnesium fluoride was actually fed, the rate of feed of magnesium fluoride, the total amount of magnesium fluoride fed, the rate of feed of scrubbing water, the total amount of scrubbing water fed and the location of the injection nozzle, as indicated by the values of a and b, are given in Table 1.

TABLE 1

| Plasma Run | Feed Time min. | Feed Rate g/min. | Scrub Flow Rate Lpm | Total MgF$_2$ g | Total H$_2$O L | a mm | b mm |
|---|---|---|---|---|---|---|---|
| 1 | 6.0 | 43.0 | 3.4 | 258.0 | 20.4 | 2.5 | 6.1 |
| 2 | 8.3 | 25.6 | 3.4 | 212.5 | 28.2 | 2.5 | 6.1 |
| 3 | 10.0 | 19.4 | 3.4 | 194.0 | 34.0 | 5.8 | 6.1 |
| 4 | 8.6 | 27.3 | 3.4 | 234.7 | 29.2 | 2.5 | 6.1 |
| 5 | 4.0 | 31.5 | 3.4 | 126.0 | 13.6 | 2.5 | 6.1 |
| 6 | 10.0 | 33.2 | 3.4 | 332.0 | 34.0 | 3.8 | 6.1 |
| 7 | 10.0 | 30.7 | 3.4 | 307.0 | 34.0 | 3.8 | 6.1 |
| 8 | 18.0 | 23.0 | 6.1 | 414.0 | 109.8 | 3.8 | 6.1 |
| 9 | 10.0 | 16.8 | 6.1 | 168.0 | 61.0 | 3.8 | 2.5 |
| 10 | 10.0 | 26.1 | .6.1 | 261.0 | 61.0 | 1.0 | 1.9 |
| 11 | 10.0 | 18.1. | 6.1 | 318.0 | 61.0 | 1.0 | 1.3 |

The amount of fluoride ion in the scrubbing water was determined after each run. Fluorine is very reactive and does react with water to form HF and other products. The rate of this reaction is slow and it is believed that not all the fluorine formed in the reaction was captured by the simple scrubber used in this example; only a portion of the fluorine formed in the reaction was present as fluoride ion in the scrubbing water, some of it having passed through the scrubber and escaped detection.

There are three possible sources for fluoride ion in the scrubbing water. One possible source is unreacted dissolved magnesium fluoride. Magnesium fluoride is only very sparingly soluble and its solubility data are well known. It was assumed that the scrubbing water contained the maximum amount of magnesium fluoride that it could dissolve, i.e., that at the end of the run the scrubbing water was saturated and contained 0.07 g/L of magnesium fluoride. A second possible source of fluoride ion is from hydrogen fluoride formed during the reaction. The plasma gas was dry air that contained no hydrogen nor hydrogen-containing compounds but the possibility exists that a small amount of water vapour could travel back from the scrubber to the plasma reactor. Having regard to the high velocity of gases flowing from the plasma reactor, very little water vapour could reach the plasma. For the purpose of calculation, it was assumed that 100 ppm of water reached the plasma but it is believed that the amount would in fact be less than this. A third source of fluoride ion is from fluorine gas formed in the plasma by the reaction $$2MgF_2 + O_2 \rightarrow MgO + 2F_2$$

From the total amount of fluoride ion detected in the scrubbing water there were subtracted that amount of fluoride ion that could be due to dissolved MgF$_2$ and that amount that could be due to hydrogen fluoride formed from the 100 ppm of water in the reaction $$MgF_2 + H_2O \rightarrow MgO + HF$$

The remainder must be due to the formation in the plasma of fluorine gas F$_2$. The results are given in Table 2

TABLE 2

| Plama Run | F mg/L | Total F in H$_2$O g | F Due to Dissolution of MgF$_2$ in H$_2$O g | F Due to Dissolution of HF in H$_2$O g | Excess F in H$_2$O g |
|---|---|---|---|---|---|
| 1 | 386.0 | 7.9 | 0.9 | 0.3 | 6.7 |
| 2 | 281.0 | 7.9 | 1.3 | 0.4 | 6.2 |
| 3 | 238.0 | 8.1 | 1.6 | 0.5 | 6.0 |
| 4 | 286.0 | 8.3 | 1.3 | 0.5 | 6.5 |
| 5 | 192.0 | 2.6 | 0.6 | 0.3 | 1.7 |
| 6 | 291.0 | 9.9 | 1.6 | 0.5 | 7.8 |
| 7 | 268.0 | 9.1 | 1.6 | 0.5 | 7.0 |
| 8 | 136.0 | 14.9 | 5.1 | 1.0 | 8.8 |
| 9 | 142.0 | 8.7 | 2.8 | 0.5 | 5.4 |
| 10 | 220.0 | 13.4 | 2.8 | 0.5 | 10.1 |
| 11 | 147.0 | 9.0 | 2.8 | 0.5 | 5.7 |

As indicated above, it is believed that the amount of fluoride ion due to HF is overstated, from which it follows that the amount due to formation of F$_2$ is understated.

Solid material collected from regions A, B, C and D of FIG. 1 was collected and particle sizes were determined using Micromeritics Sedigraph 5000D or 5100D.

Solid material was also subjected to XRD using an ENRAF NONIUS DELFT DIFFRACTIS 582. The percentages of MgO in samples from region C of the reactor of FIG. 1 were determined by chemical analysis and results from runs 4, 6 and 8 are given in Table 3. Runs 4, 6 and 8 were selected for further consideration because they were carried out at different temperatures but otherwise under fairly similar conditions.

TABLE 3

| | Chemical Analyses of Solids | |
|---|---|---|
| Run | % MgF$_2$ | % MgO |
| 4 | 79.9 | 20.1 |
| 6 | 86.4 | 13.6 |
| 8 | 83.1 | 16.9 |

Formation of MgO is a further indication that there has occurred the required reaction $$2MgF_2 + O_2 \rightarrow MgO + 2F_2$$

The particle size distribution of the collected solids was determined by sedimentation technique using a Micromeritics Sedigraph 5000D or 5100D instrument. Table 4 gives the weight percentage of solids recovered in runs 4, 6 and 8 that had a diameter of less than 0.3 μm.

TABLE 4

| Run | Weight % Solids < 0.3 μm diameter |
|---|---|
| 4 | 22 |
| 6 | 20 |

TABLE 4-continued

| Run | Weight % Solids < 0.3 μm diameter |
|---|---|
| 8 | 23 |

Examination of the collected solids by SEM revealed that only the particles with mean particle diameter less than 0.3 μm were amorphous. It was assumed that the remainder of the solids did not acquire enough heat to dissociate and have opportunity to participate in the reaction. On the basis of the information given in Tables 3 and 4, the true conversions of $MgF_2$ to MgO in the thermal plasma were calculated. Thus, as shown in Table 4, in run 4 only 22% of the solids acquired sufficient heat to participate in the reaction. As shown in Table 3, 20.1% of MgO was obtained. The efficiency of conversion was therefore $$\frac{20.1}{22} \times 100 = 91\%$$

The efficiencies of conversion of the runs 6 and 8 were calculated in a similar manner and are given in Table 5, together with the temperatures.

TABLE 5

| Run | Gas Temperature K. | Efficiency of Conversion to MgO |
|---|---|---|
| 4 | 5800 | 91 |
| 6 | 5500 | 66 |
| 8 | 5650 | 73 |

Figure 4:
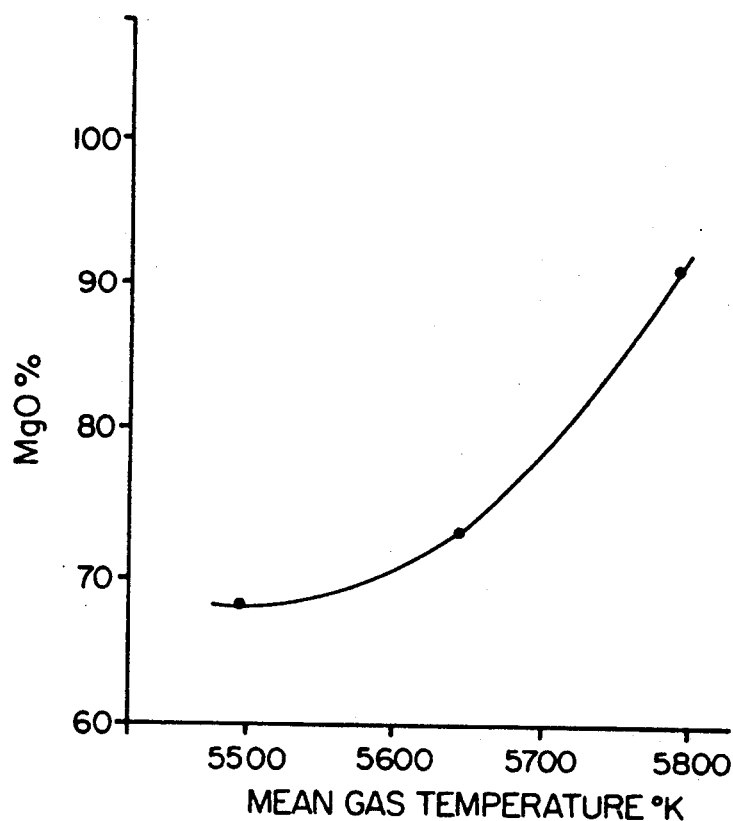
FIG. 4 is a graph showing the efficiency of conversion of $MgF_2$ as a function of plasma temperature (specific enthalpy)

These results are shown graphically in FIG. 4 and clearly demonstrate that efficiency of conversion increases with temperature.

EXAMPLE 2

In another set of experiments an intimate mixture of $MgF_2$ of uranium ($U_3O_8$) was heated in a graphite crucible using a 35kW nitrogen/argon plasma torch. It was estimated that the temperature was in excess of 4000 K and probably in excess of 5000 K. The products of the reaction were collected in a water trap, after quenching out MgO, and analyzed. Table 6 gives the experimental conditions and the results obtained.

TABLE 6

Results of Heating of a Mixture of $U_3O_8$ and $MgF_2$ in a Plasma Torch

| Run | $MgF_2/U_3O_8$ Ratio | Unit Reactants Mg | F | U | Products Mg | F | U | F/U Molar Ratio |
|---|---|---|---|---|---|---|---|---|
| 12 | 90 | 33.6 | 42.6 | 11.1 | 1.8 | 30.3 | 57.2 | 6.0 |
| 13 | 18 | 22.1 | 34.5 | 36.4 | 2.0 | 23.1 | 54.0 | 4.6 |
| 14 | 9 | 15.4 | 24.1 | 51.0 | 2.8 | 24.4 | 54.9 | 4.5 |

It can be seen from Table 6 that $U_3O_8$ originally present in the reaction mixture was recovered in the form of uranium fluoride, with only a small amount of magnesium impurity present in the product. It was assumed that all Mg in the product was present as $MgF_2$. The amount of fluorine in the product that would be present as $MgF_2$ was deducted from the amount of fluorine in the product. The remainder of the fluorine in the product was assumed to be present as a fluoride of uranium and that remainder was used in the calculation of the molar ratio of F:U. It is of interest to note that in the case of large excess of $MgF_2$ (run 12), the molar ratio of fluorine to uranium in the final product is 6, indicating the formation of $UF_6$. At present $UF_6$ is produced only in a complicated multi-stage process.

EXAMPLE 3

Figure 5:
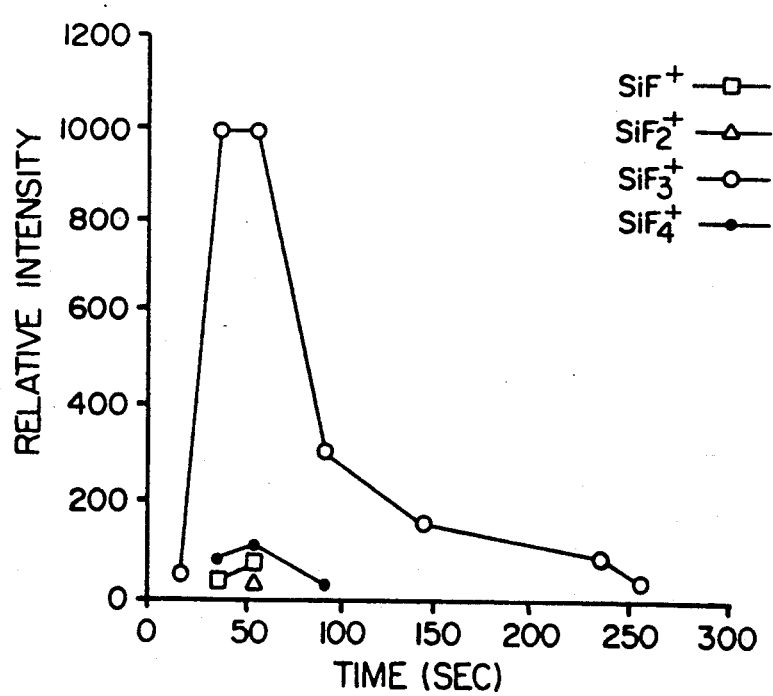
FIG. 5 is a graph showing a mass spectrometry analysis of gases resulting from plasma melting of pure $MgF_2$ and absorption of the products of reaction, as explained in greater detail in Example 3 below.

In yet another set of experiments magnesium fluoride alone was heated in a graphite crucible by a 35 kW plasma torch in a nitrogen plasma at a temperature estimated to be in excess of 4000 K and probably in excess of 5000 K. The off gases from the reaction were passed through silica gel and the product was analyzed by a mass spectrometer. The results in FIG. 5 show the presence of $SiF^+$, $SiF_2^+$, $SiF_4^+$ and, as the major component, $SiF_3^+$. This confirms that fluorine was generated, since only fluorine reacting with $SiO_2$ could have resulted in the presence of $SiF^+$, $SiF_2^+$, $SiF_3^+$ and $SiF_u^+$ in the mass sprectrometer. MgO was also recovered.

EXAMPLE 4

A stoichiometric mixture of $MgF_2$ and $SiO_2$ (initial mass 416.4 g) was subjected to a plasma of 15.1 kW power, the plasma gas being a 50/50 mixture of argon and nitrogen, for a period of 6 minutes. It was estimated that the temperature was in excess of 4000 K and probably in excess of 5000 K. Gas from the reaction was examined by a mass spectrometer and showed a peak in the spectrum that indicated the presence of silicon tetrafluoride.

Gas from the reaction was collected in a scrubber containing a 10% KOH solution and subjected to chemical analysis for fluoride ion. Average of two analyses gave approximately 22 grams of fluoride ion. Also present in the scrubber was silica gel. These results clearly indicate that there has occurred the reaction:

$$2\, MgF_2 + SiO_2 + SiO_2 \rightarrow SiF_4 + 2MgO$$

The silica tetrafluoride hydrolyses immediately in the water 10% KOH solution of the scrubber to yield the observed fluoride ions and silica gel, which was also observed.

It was estimated that, on average, $SiF_4$ constituted approximately 4% by volume of the off gas.

EXAMPLE 5

A 50/50 weight mixture of calcium fluoride and alumina (initial mass 261.4 g) was subjected to a plasma of 15.0 kW power, the plasma gas being nitrogen, for a period of 4 minutes, at a temperature estimated to exceed 4000 K and probably in excess of 5000 K.

Gas from the reaction was collected in a scrubber and subjected to analysis for fluoride ion. Approximately 180 mg of fluoride ion was detected in the scrubber solution (10% KOH), indicating that there had occurred the reaction:

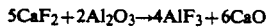

$$5CaF_2 + 2Al_2O_3 \rightarrow 4AlF_3 + 6CaO$$

A substantial quantity of condensate built up in the reactor and it is believed that this condensate contained a significant amount of $AlF_3$. The chemical analysis to which the scrubber water was subjected detects fluoride ions but does not detected undissolved $AlF_3$, so any undissolved $AlF_3$ would have been undetected. For these two reasons, it is hypothesized that the amount of fluorine present in $AlF_3$ is considerably higher than the 180 mg observed in the scrubber water.

EXAMPLE 6

A stoichiometric mixture of CaF$_2$ and SiO$_2$ (initial mass 218.6 g) was subjected to a plasma of 15.1 kW power, the plasma gas being a 50/50 mixture argon and nitrogen, for a period of 6 minutes, at a temperature estimated to be in excess of 4000 K and probably in excess of 5000 K. Gas from the reaction was examined by a mass spectrometer and showed a peak in the spectrum that indicated the presence of silicon tetrafluoride.

Gas from the reaction was collected in a scrubber containing a 10% KOH solution and subjected to chemical analysis for fluoride ion. Average of two analyses gave approximately 14 g of fluoride ion. Also present in the scrubber was silica gel. These results clearly indicate that there has occurred the reaction:

$$2CaF_2 + SiO_2 \rightarrow SiF_4 + 2CaO$$

The silica tetrafluoride hydrolyses immediately in the scrubber solution to yield the observed fluoride ions and silica gel.

It was estimated that, on average, SiF$_4$ constituted approximately 3% by volume of the off gas.

This example was repeated using 236.3 g of the stoichiometric mixture of CaF$_2$ and SiO$_2$. Average of two analyses indicated that approximately 16 g of fluoride ion were present in the scrubber.

What we claim is:

1. A process for producing free fluorine gas or a fluoride, which comprises subjecting the compound MF$_n$, where M is a metal and n is the valency of the metal and has a value from 1 to 6 inclusive, to the effect of a thermal plasma at a temperature of at least 3000 K to cause MF$_n$ to separate into its constituents, the reaction being carried out in the presence of an added oxide of uranium that reacts with the metal and/or the fluorine to prevent their recombination so that there is formed a fluoride of uranium.

2. A process according to claim 1 wherein the metal M is calcium.

3. A process according to claim 1 wherein the compound MF$_n$ is fluorspar.

4. A process according to claim 1 wherein the compound MF$_n$ is MgF$_2$.

5. A process according to claim 1 wherein the compound MF$_n$ is MgF$_2$ that is contaminated with uranium and is obtained from reduction of UF$_4$ to uranium metal by the thermite process.

6. A process according to claim 1 wherein the compound MF$_n$ is UF$_6$ in which the uranium is depleted of $^{235}$U.

7. A process according to claim 1 wherein the temperature is in excess of 5000 K.

8. A process according to claim 1 wherein the compound MF$_n$ is CaF$_2$ or MgF$_2$ and the products of the reaction include UF$_6$.

9. A process according to claim 8 wherein the plasma is a nitrogen or argon plasma and the plasma temperature is in excess of 5000 K.

* * * * *